Oct. 14, 1947.　　　F. L. WALKER　　　2,429,038
QUICK RELEASING NIPPLE CHUCK FOR PIPE THREADING MACHINES
Filed Dec. 20, 1944
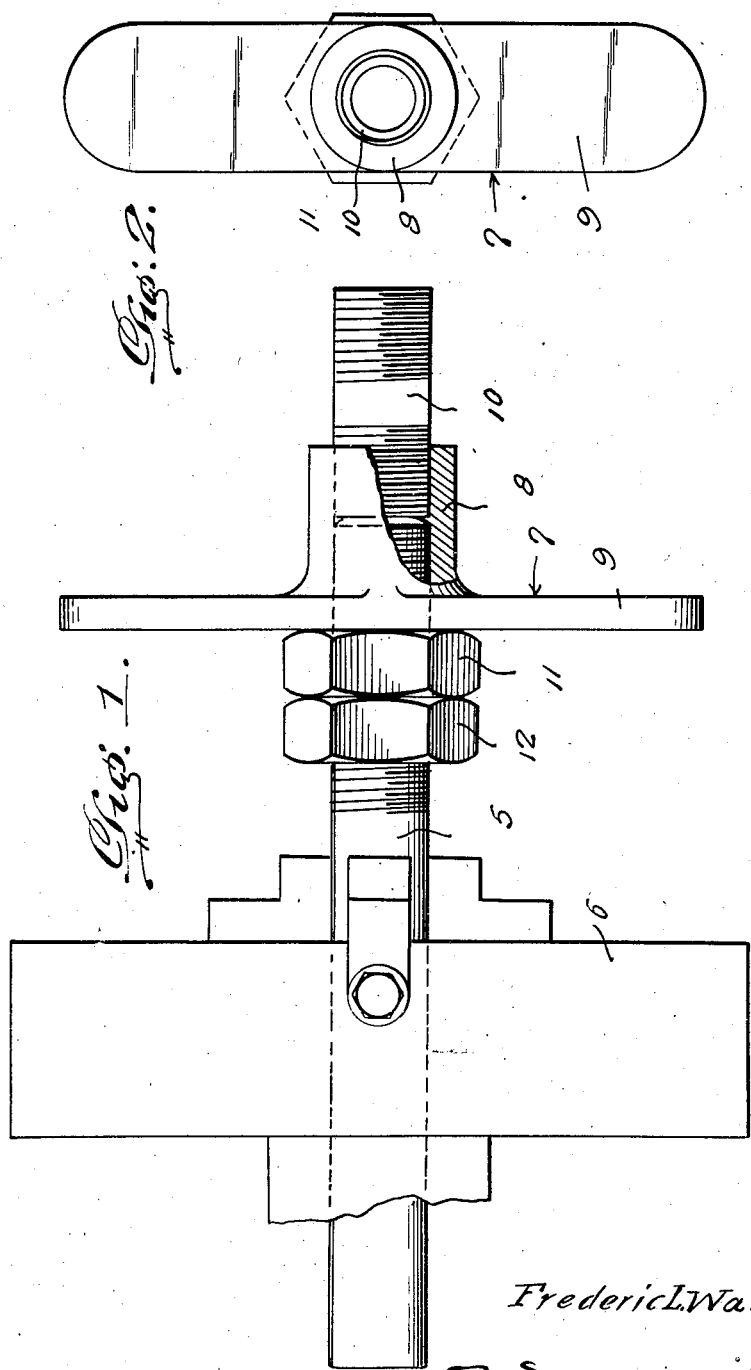
Inventor
Frederic L. Walker,
By McMorrey and Broman
Attorneys Patented Oct. 14, 1947

2,429,038

UNITED STATES PATENT OFFICE 2,429,038

QUICK RELEASING NIPPLE CHUCK FOR PIPE THREADING MACHINES

Frederic L. Walker, Lake Charles, La.

Application December 20, 1944, Serial No. 569,046

1 Claim. (Cl. 279—7)

The present invention relates to new and useful improvements in attachments for pipe threading machines and more particularly to a quick releasing chuck for a pipe nipple adapted for holding the nipple in position while being threaded by the machine.

An important object of the present invention is to provide a device of this character by means of which the nipple may be attached to and removed from the chuck without requiring shutting down of the pipe threading machine.

A further object is to provide a device of this character of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a fragmentary side elevational view with parts broken away and shown in section, and Figure 2 is an end elevational view of the chuck for the pipe nipple.

Referring now to the drawing in detail wherein for the purpose of illustration I have disclosed a preferred embodiment of the invention, the numeral 5 designates a shaft threaded at one end and adapted for attaching to a chuck 6 of conventional construction of a pipe threading machine.

A pipe nipple chuck designated generally at 7 includes a sleeve portion 8 threaded on the end of the shaft 5, one end of the sleeve being formed with a pair of radially extending handles 9 extending transversely from the sleeve at their diametrically opposite sides thereof. The chuck 7 is threaded on the shaft 5 with the sleeve 8 projecting outwardly beyond the shaft and adapted for threaded engagement with one end of a pipe nipple 10 for holding the pipe nipple in a position for threading the outer end of the nipple by the die stock of a pipe threading machine.

An adjusting nut 11 is threaded on the shaft 5 in abutting engagement with the handle end of the nipple chuck 7 and a lock nut 12 is threaded on the shaft inwardly of the adjusting nut.

In the operation of the device the shaft 5 is locked in the pipe machine chuck 6 and the threaded sleeve 8 is adjusted on the shaft so that the nipple 10 will abut the outer end of the shaft without binding the threads thereof. The nipple may then be threaded at its outer end and when the threading operation is completed a slight tap of a hammer on the handles 9 in the direction of rotation thereof will release the nipple chuck 7 and spin it away from the adjusting nut 11, so that while holding the handle 9 with one hand the nipple 10 may be unscrewed with the other hand. This action will allow the machine to screw the nipple chuck 7 back against the adjusting nut 11 to receive another nipple.

It is believed that the details of construction, manner of operation of advantages of the device will be readily understood from the foregoing without further detailed explanation.

Having thus described the invention, what I claim is:

An attachment for a pipe threading machine including a rotatable threaded shaft adapted for being locked with one end in the chuck of the pipe threading machine, said attachment comprising a pipe nipple chuck including an interiorly threaded sleeve adapted for threading engagement on the shaft and projecting outwardly of the other end of the shaft and also adapted for threaded engagement with one end of a pipe nipple the other end of which is being threaded, radially extending handles carried by the end of the pipe nipple chuck on the shaft, said handles for threading the pipe nipple chuck on and off the shaft, an adjusting nut on the shaft and during the nipple threading operation with one end engaging the handle carrying end of the sleeve, and a lock nut engaging the other end of the adjusting nut.

FREDERIC L. WALKER.

REFERENCES CITED

The following references are of record in the file of this patent:

UNITED STATES PATENTS

| Number | Name | Date |
|---|---|---|
| 429,832 | Aschenbach | June 10, 1890 |
| 851,137 | Manley | Apr. 23, 1907 |
| 866,361 | Hitchcock | Sept. 17, 1907 |